United States Patent
Lu et al.

(10) Patent No.: US 12,245,093 B2
(45) Date of Patent: Mar. 4, 2025

(54) METHOD AND APPARATUS FOR DETERMINING SIGNAL QUALITY INFORMATION OF FREQUENCY

(71) Applicant: HUAWEI TECHNOLOGIES CO., LTD., Guangdong (CN)

(72) Inventors: Jun Lu, Shanghai (CN); Hanye Pu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 537 days.

(21) Appl. No.: 17/508,555

(22) Filed: Oct. 22, 2021

(65) Prior Publication Data

US 2022/0046499 A1 Feb. 10, 2022

Related U.S. Application Data

(63) Continuation of application No. PCT/CN2019/083741, filed on Apr. 22, 2019.

(51) Int. Cl.
*H04L 1/20* (2006.01)
*H04B 17/309* (2015.01)
(Continued)

(52) U.S. Cl.
CPC ...... *H04W 36/0094* (2013.01); *H04B 17/309* (2015.01); *H04L 1/20* (2013.01);
(Continued)

(58) Field of Classification Search
None
See application file for complete search history.

(56) References Cited

U.S. PATENT DOCUMENTS

2009/0059861 A1* 3/2009 Gunnarsson .... H04W 36/00837
370/332
2010/0296555 A1* 11/2010 Cahill ................. H04M 11/062
375/219
(Continued)

FOREIGN PATENT DOCUMENTS

CN 101730127 A * 6/2010
CN 103167585 A 6/2013
(Continued)

OTHER PUBLICATIONS

PCT International Search Report and Written Opinion issued in International Application No. PCT/CN2019/083741 on Jan. 23, 2020, 13 pages (with English translation).
(Continued)

*Primary Examiner* — The Hy Nguyen
(74) *Attorney, Agent, or Firm* — Fish & Richardson P.C.

(57) ABSTRACT

This application provides a method and an apparatus for determining signal quality information of a frequency. On example method includes obtaining, by a network device, signal quality information, of a first frequency, from a plurality of terminal devices, wherein the first frequency is a frequency used by a serving cell accessed by the plurality of terminal devices; and determining, by the network device, signal quality information of a second frequency based on the signal quality information of the first frequency and a stored first mapping relationship, wherein the second frequency is different from the first frequency, and the first mapping relationship is a mapping relationship between the signal quality information of the first frequency and the signal quality information of the second frequency.

15 Claims, 4 Drawing Sheets

S301
A network device obtains signal quality information, of a first frequency, measured by terminal devices S302
The network device determines signal quality information of a second frequency based on the signal quality information of the first frequency and a stored first mapping relationship

(51) Int. Cl.
*H04W 24/10* (2009.01)
*H04W 36/00* (2009.01)
*H04W 36/22* (2009.01)
*H04W 36/30* (2009.01)

(52) U.S. Cl.
CPC ........... *H04W 24/10* (2013.01); *H04W 36/22* (2013.01); *H04W 36/302* (2023.05)

(56) References Cited

U.S. PATENT DOCUMENTS

| | | | |
|---|---|---|---|
| 2011/0122769 A1 | 5/2011 | Zhang | |
| 2017/0201973 A1* | 7/2017 | Yang | H04W 36/0088 |
| 2017/0374574 A1* | 12/2017 | Lee | H04W 24/08 |
| 2018/0295520 A1 | 10/2018 | Garg et al. | |

FOREIGN PATENT DOCUMENTS

| | | |
|---|---|---|
| CN | 104244278 A | 12/2014 |
| CN | 108769982 A | 11/2018 |
| CN | 108966314 A | 12/2018 |
| CN | 106656357 B | 2/2020 |
| EP | 2296322 A1 | 3/2011 |
| JP | 2008524917 A | 7/2008 |
| WO | 0221756 A2 | 3/2002 |
| WO | 2014093977 A1 | 6/2014 |
| WO | 2015023222 A1 | 2/2015 |

OTHER PUBLICATIONS

Ericsson (email rapporteur), "[98#52][NB-IOT] Power Consumption for RRM," 3GPP TSG-RAN2 Meeting #99, R2-1708277, Berlin, Germany, Aug. 21-25, 2017, 12 pages.
Nokia, Nokia Shanghai Bell, "Intra and Inter Frequency Scenarios," 3GPP TSG-RAN WG2 Meeting #113bis Electronic, R2-2102942, Elbonia, Apr. 12-20, 2021, 9 pages.
Huawei, HiSilicon, "Intra and inter frequency measurement definition in multiple reference signal transmission scenario," 3GPP TSG-RAN WG4 Meeting NR#3, R4-1709626, Nagoya, Japan, Sep. 18-21, 2017, 5 pages.
Office Action issued in Chinese Application No. 201980084782.2 on Jan. 10, 2022, 8 pages.
Extended European Search Report issued in European Application No. 19925647.0 on Mar. 21, 2022, 9 pages.
Office Action in Japanese Appln. No. 2021-563120, dated Dec. 5, 2022, 7 pages (with English translation).

* cited by examiner

METHOD AND APPARATUS FOR DETERMINING SIGNAL QUALITY INFORMATION OF FREQUENCY

CROSS-REFERENCE TO RELATED APPLICATIONS

This application is a continuation of International Application No. PCT/CN2019/083741, filed on Apr. 22, 2019, the disclosure of which is hereby incorporated by reference in its entirety

TECHNICAL FIELD

This application relates to the field of communications technologies, and in particular, to a method and an apparatus for determining signal quality information of a frequency.

BACKGROUND

After accessing a serving cell, terminal devices need to perform neighboring cell measurement, to finally obtain signal quality information of a frequency used by a neighboring cell. In this way, a network device can select a carrier for the terminal devices based on the signal quality information, to finally implement cell reselection or handover. Types of the neighboring cell measurement include intra-frequency measurement, inter-frequency measurement, inter-RAT measurement, and the like.

The intra-frequency measurement is measurement performed by the terminal devices on quality of a signal in a first-type neighboring cell, and a frequency used by the first-type neighboring cell is the same as a frequency used by the serving cell (namely, an operating frequency of the terminal devices).

The inter-frequency measurement is measurement performed by the terminal devices on quality of a signal in a second-type neighboring cell, and a frequency used by the second-type neighboring cell is different from the frequency used by the serving cell.

The inter-RAT measurement is measurement performed by the terminal devices on quality of a signal in a third-type neighboring cell, and a type of a mobile communications system to which the third-type neighboring cell belongs is different from a type of a mobile communications system to which the serving cell belongs. Because different frequency bands are allocated to different types of mobile communications systems, a frequency used by the third-type neighboring cell is also different from the frequency used by the serving cell.

As shown in FIG. 1, a measurement gap (gap) needs to be used for the inter-frequency measurement or the inter-RAT measurement performed by the terminal devices. Because the terminal devices suspend service transmission in the measurement gap, service throughputs of the terminal devices are reduced. In addition, the terminal devices usually need to measure a plurality of frequencies, and a time length (usually hundreds of milliseconds (ms), for example, 480 ms or 240 ms) consumed for measuring each frequency is far greater than a time length of the measurement gap (usually 6 ms). Therefore, the terminal devices need a plurality of measurement gaps to complete the inter-frequency measurement or the inter-RAT measurement. Consequently, the network device also requires a relatively long time length to obtain signal quality information of each frequency. This further prolongs a time length in which the network device selects the carrier for the terminal devices, and affects a carrier selection gain.

SUMMARY

Embodiments of this application provide a method and an apparatus for determining signal quality information of a frequency, to ensure service throughputs of terminal devices, avoid overheads of inter-frequency measurement and inter-RAT measurement, and shorten a time length in which a network device determines signal quality information of a frequency.

According to a first aspect, an embodiment of this application provides a method for determining signal quality information of a frequency. The method may be applied to a communications system having a multi-frequency scenario shown in FIG. 2. The method specifically includes the following steps.

A network device obtains signal quality information, of a first frequency, measured by terminal devices, where the first frequency is a frequency used by a serving cell accessed by the terminal devices. Then, the network device determines signal quality information of a second frequency based on the signal quality information of the first frequency and a stored first mapping relationship, where the second frequency is different from the first frequency, and the first mapping relationship is a mapping relationship between the signal quality information of the first frequency and the signal quality information of the second frequency.

According to the method, the terminal devices do not need to perform inter-frequency measurement or inter-RAT measurement, but only need to perform intra-frequency measurement and report signal quality information of an intra-frequency to the network device, so that the network device can determine signal quality information of an inter-frequency. In this way, the network device may select a carrier for the terminal devices (that is, select a target cell for the terminal devices during cell reselection or handover) based on the signal quality information of the intra-frequency and the signal quality information of the inter-frequency. Clearly, because the terminal devices do not need to perform the inter-frequency measurement or the inter-RAT measurement, in addition to ensuing a carrier selection gain, the method can further ensure service continuity and service throughputs of the terminal devices, and avoid overheads of the inter-frequency measurement and the inter-RAT measurement. In addition, because time lengths in which the terminal devices perform the intra-frequency measurement are far less than time lengths in which the terminal devices perform the inter-frequency measurement and the inter-RAT measurement, the method may further shorten a time length in which the network device determines the signal quality information of the inter-frequency.

In a possible design, the network device may obtain, in a manner including but not limited to the following manners, the signal quality information, of the first frequency, measured by the terminal devices.

Manner 1: The network device may send measurement configuration information to the terminal devices, to indicate the terminal devices to perform the intra-frequency measurement. The measurement configuration information may include the following information: a to-be-measured frequency (namely, the first frequency), a list of to-be-measured cells (a list of first neighboring cells), a to-be-measured signal quality parameter, a reporting manner, and the like.

Manner 2: The terminal devices may perform the intra-frequency measurement, and report the measured signal quality information of the first frequency to the network device.

The first neighboring cell is a neighboring cell that is of the serving cell and that uses the first frequency, and is also referred to as an intra-frequency neighboring cell.

In a possible design, the first mapping relationship is obtained by modeling sample data of the signal quality information of the first frequency and sample data of the signal quality information of the second frequency.

The sample data of the signal quality information of the first frequency includes signal quality information, of the first frequency, measured for a plurality of times by the plurality of terminal devices that access the serving cell; and signal quality information, of the first frequency, measured by each terminal device includes a signal quality parameter of a first neighboring cell, where the first neighboring cell uses the first frequency.

The sample data of the signal quality information of the second frequency includes signal quality information, of the second frequency, measured for a plurality of times by the plurality of terminal devices that access the serving cell; and signal quality information, of the second frequency, measured by each terminal device includes a signal quality parameter of a second neighboring cell, where the second neighboring cell uses the second frequency.

In this design, the first mapping relationship is obtained by modeling the actually measured sample data of the signal quality information of the first frequency and the actually measured sample data of the signal quality information of the second frequency. This ensures accuracy of the first mapping relationship.

In a possible design, the network device may select a target frequency having high signal quality for the terminal devices based on the obtained signal quality information of the first frequency and the determined signal quality information of the second frequency; then use a carrier corresponding to the target frequency as a target carrier of the terminal devices; and use, as a target cell for cell reselection or handover of the terminal devices, a cell that uses the target carrier. In this way, signal transmission quality of the terminal devices obtained after the terminal devices are handed over to the target cell can be ensured.

In a possible design, the network device may further determine spectral efficiency of the serving cell by performing the following steps.

The network device obtains load information of the first neighboring cell. Then, the network device determines the spectral efficiency of the serving cell based on the signal quality information of the first frequency, the load information of the first neighboring cell, and a stored second mapping relationship, where the second mapping relationship is a mapping relationship between the signal quality information of the first frequency and the load information of the first neighboring cell and the spectral efficiency of the serving cell.

According to this design, when the network device selects the target frequency and the target carrier (namely, the target cell) for the terminal devices, a factor of the spectral efficiency of the serving cell may be further considered. Therefore, after the terminal devices are handed over to the target cell, not only the signal transmission quality of the terminal devices but also signal transmission efficiency of the terminal devices can be ensured.

In a possible design, the second mapping relationship is obtained by modeling the sample data of the signal quality information of the first frequency, sample data of the load information of the first neighboring cell, and sample data of the spectral efficiency of the serving cell.

The sample data of the load information of the first neighboring cell includes load information, of the first neighboring cell, obtained each time the plurality of terminal devices that access the serving cell measure the signal quality information of the first frequency.

The sample data of the spectral efficiency of the serving cell includes spectral efficiency, of the serving cell, obtained each time the plurality of terminal devices that access the serving cell measure the signal quality information of the first frequency.

According to this design, the second mapping relationship is obtained by modeling the actual sample data. This ensures accuracy of the second mapping relationship.

In a possible design, the network device may further determine spectral efficiency of the second neighboring cell by performing the following steps.

The network device obtains load information of the second neighboring cell. The network device determines the spectral efficiency of the second neighboring cell based on the signal quality information of the first frequency, the load information of the second neighboring cell, and a stored third mapping relationship, where the third mapping relationship is a mapping relationship between the signal quality information of the first frequency and the load information of the second neighboring cell and the spectral efficiency of the second neighboring cell.

According to this design, when the network device selects the target frequency and the target carrier (namely, the target cell) for the terminal devices, a factor of the spectral efficiency of the second neighboring cell may be further considered. Therefore, after the terminal devices are handed over to the target cell, not only the signal transmission quality of the terminal devices but also signal transmission efficiency of the terminal devices can be ensured.

In a possible design, the third mapping relationship is obtained by modeling the sample data of the signal quality information of the first frequency, sample data of the load information of the second neighboring cell, and sample data of the spectral efficiency of the second neighboring cell.

The sample data of the load information of the second neighboring cell includes load information, of the second neighboring cell, obtained each time the plurality of terminal devices that access the serving cell measure the signal quality information of the second frequency.

The sample data of the spectral efficiency of the second neighboring cell includes spectral efficiency, of the second neighboring cell, obtained each time the plurality of terminal devices that access the serving cell measure the signal quality information of the second frequency.

According to this design, the third mapping relationship is obtained by modeling the actual sample data. This ensures accuracy of the third mapping relationship.

According to a second aspect, an embodiment of this application further provides a mapping relationship maintenance method. The following describes the method by using an example in which an execution body is a network device.

The network device collects a plurality of pieces of sample data, where each piece of sample data includes each piece of sample data required for constructing the mapping relationship. The network device models the plurality of pieces of collected sample data by using a machine learning technology, to obtain the mapping relationship. The network device monitors accuracy of the mapping relationship. When the accuracy of the mapping relationship is relatively low, the network device stops using the mapping relationship, and may update the mapping relationship by repeating the foregoing two steps or repeating the second step.

According to the method, the network device can obtain the mapping relationship, and ensure the accuracy of the mapping relationship.

In a possible design, when the mapping relationship is a first mapping relationship, one piece of sample data includes signal quality information, of a first frequency, obtained through intra-frequency measurement, and signal quality information, of a second frequency, obtained through inter-frequency measurement or inter-RAT measurement, where the network device indicates, at a same time, terminal devices to perform the intra-frequency measurement and to perform the inter-frequency measurement or the inter-RAT measurement.

In a possible design, when the mapping relationship is a second mapping relationship, one piece of sample data includes signal quality information, of a first frequency, obtained when the network device indicates, at a time, terminal devices to perform intra-frequency measurement, load information, of a first neighboring cell, obtained when the plurality of terminal devices that access a serving cell perform the intra-frequency measurement this time, and spectral efficiency, of the serving cell, obtained when the plurality of terminal devices that access the serving cell perform the intra-frequency measurement this time.

In a possible design, when the mapping relationship is a third mapping relationship, one piece of sample data includes signal quality information, of a first frequency, obtained when the network device indicates, at a time, terminal devices to perform intra-frequency measurement, load information, of a second neighboring cell, obtained when the plurality of terminal devices that access a serving cell perform inter-frequency measurement or inter-RAT measurement this time, and spectral efficiency, of the second neighboring cell, obtained when the plurality of terminal devices that access the serving cell perform the inter-frequency measurement or the inter-RAT measurement this time.

In a possible design, the network device may monitor the accuracy of the maintained mapping relationship in the following manners.

Manner 1: The network device monitors a cell configuration success rate. When the configuration success rate is less than a specified success rate threshold, the network device determines that accuracy of the first mapping relationship is relatively low.

Each time after the network device determines a piece of information based on the mapping relationship, and selects a target cell for the terminal devices based on the information, the network device updates the cell configuration success rate.

Cell configuration success rate=Quantity of terminal devices that successfully access the target cell determined by the network device for the terminal devices/Total quantity of terminal devices for which the network device determines the target cell.

Manner 2: The network device periodically tests the mapping relationship.

For example, the first mapping relationship is tested. The network device may indicate the terminal devices that access the serving cell to perform the intra-frequency measurement, and the inter-frequency measurement or the inter-RAT measurement, to obtain the signal quality information of the first frequency and the signal quality information of the second frequency. Then, the network device uses the obtained signal quality information of the first frequency and the obtained signal quality information of the second frequency as test data; and calculates signal quality information of the second frequency based on the signal quality information of the first frequency in the test data and the first mapping relationship. Finally, the network device determines a difference between the calculated signal quality information of the second frequency and the signal quality information of the second frequency in the test data. When the difference is less than a specified difference threshold, it indicates that accuracy of the first mapping relationship is relatively high; or when the difference is greater than or equal to the specified difference threshold, it indicates that accuracy of the first mapping relationship is relatively low.

According to a third aspect, an embodiment of this application provides an apparatus for determining signal quality information of a frequency. The apparatus includes units configured to perform the steps according to the first aspect or the second aspect.

According to a fourth aspect, an embodiment of this application provides a network device. The network device includes at least one processing element and at least one storage element. The at least one storage element is configured to store a program and data, and the at least one processing element is configured to perform the method according to the first aspect or the second aspect of this application.

According to a fifth aspect, an embodiment of this application further provides a computer program. When the computer program is run on a computer, the computer is enabled to perform the method according to either of the foregoing aspects.

According to a sixth aspect, an embodiment of this application further provides a computer storage medium. The computer storage medium stores a computer program, and when the computer program is executed by a computer, the computer is enabled to perform the method according to either of the foregoing aspects.

According to a seventh aspect, an embodiment of this application further provides a chip. The chip is configured to read a computer program stored in a memory, to perform the method according to either of the foregoing aspects.

According to an eighth aspect, an embodiment of this application further provides a chip system. The chip system includes a processor, configured to support a computer apparatus in implementing the method according to either of the foregoing aspects. In a possible design, the chip system further includes a memory. The memory is configured to store a program and data that are necessary for the computer apparatus. The chip system may include a chip, or may include a chip and another discrete component.

DESCRIPTION OF EMBODIMENTS

Figure 1:
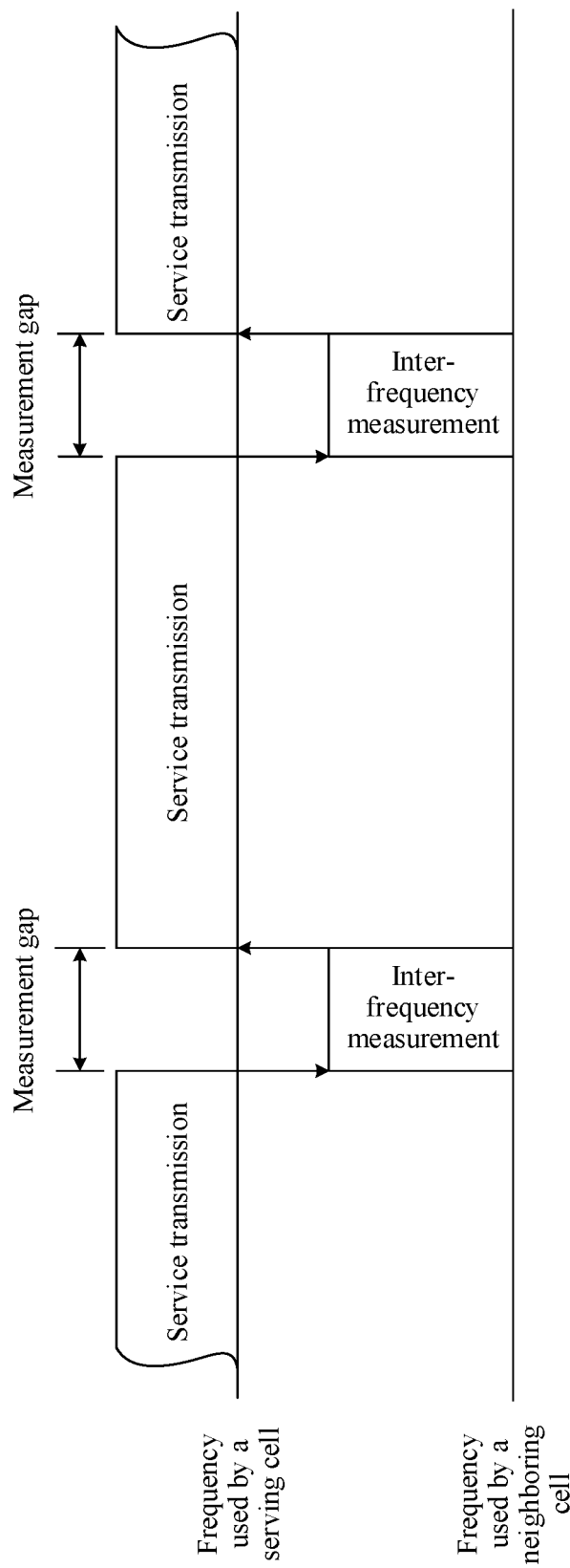
FIG. 1 is a schematic diagram of inter-frequency measurement in a conventional technology.

This application provides a method and an apparatus for determining signal quality information of a frequency, to ensure service throughputs of terminal devices, avoid overheads of inter-frequency measurement and inter-RAT measurement, and shorten a time length in which a base station determines signal quality information of a frequency. The method and the apparatus are based on a same technical concept. Because a problem-resolving principle of the method is similar to that of the apparatus, mutual reference may be made to implementations of the apparatus and the method. Repeated parts are not described in detail again.

In solutions provided in embodiments of this application, a network device may quickly obtain signal quality information of an inter-frequency (namely, a second frequency) based on signal quality information, of an intra-frequency (namely, a first frequency), obtained by terminal devices through intra-frequency measurement and a mapping relationship between the signal quality information of the intra-frequency and the signal quality information of the inter-frequency. In this method, the terminal devices do not need to perform the inter-frequency measurement or the inter-RAT measurement, but only need to perform the intra-frequency measurement and report the signal quality information of the intra-frequency to the network device, so that the network device can determine the signal quality information of the inter-frequency. In this way, the network device may select a carrier for the terminal devices (that is, select a target cell for the terminal devices during cell reselection or handover) based on the signal quality information of the intra-frequency and the signal quality information of the inter-frequency. Clearly, because the terminal devices do not need to perform the inter-frequency measurement or the inter-RAT measurement, in addition to ensuing a carrier selection gain, the method can further ensure service continuity and service throughputs of the terminal devices, and avoid the overheads of the inter-frequency measurement and the inter-RAT measurement. In addition, because time lengths in which the terminal devices perform the intra-frequency measurement are far less than time lengths in which the terminal devices perform the inter-frequency measurement and the inter-RAT measurement, the method may further shorten a time length in which the network device determines the signal quality information of the inter-frequency.

The following describes some terms in this application, to facilitate understanding of a person skilled in the art.

(1) The terminal device is a device that provides voice and/or data connectivity for a user. The terminal device may also be referred to as user equipment (user equipment, UE), a mobile station (mobile station, MS), a mobile terminal (mobile terminal, MT), or the like.

For example, the terminal device may be a handheld device or a vehicle-mounted device having a wireless connection function. Currently, for example, the terminal device is a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

(2) The network device is a device that connects the terminal device to a wireless network in a communications system. As a node in a radio access network, the network device may also be referred to as a base station, or may be referred to as a radio access network (radio access network, RAN) node (or device).

Currently, for example, the network device is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB (HNB)), or a baseband unit (baseband unit, BBU).

In addition, in a network structure, the network device may include a centralized unit (centralized unit, CU) node and a distributed unit (distributed unit, DU) node. In this structure, protocol layers of an eNB in a long term evolution (long term evolution, LTE) system are split, where functions of some protocol layers are centrally controlled by the CU, functions of some or all of remaining protocol layers are distributed in the DU, and the CU centrally controls the DU.

(3) The intra-frequency is a frequency that is the same as a frequency used by a serving cell of the terminal device. For ease of differentiation and description, the intra-frequency may be referred to as a first frequency in the following embodiments, and the intra-frequency and the first frequency may be mutually replaced.

(4) The inter-frequency is a frequency that is different from the frequency used by the serving cell of the terminal device. For ease of differentiation and description, the inter-frequency may be referred to as a second frequency in the following embodiments, and the inter-frequency and the second frequency may be mutually replaced.

(5) The signal quality information of the frequency includes signal quality parameters of a plurality of cells that use the frequency. In the communications system, the base station needs to select a carrier for the terminal device based on signal quality information of different frequencies, to implement cell reselection and handover.

Optionally, the signal quality parameter of the cell may include any one or any combination of the following:

a reference signal received power (reference signal received power, RSRP), a signal to interference plus noise ratio (signal to interference plus noise ratio, SINR), a received signal strength indication (received signal strength indication, RSSI), or reference signal received quality (reference signal received quality, RSRQ).

In the embodiments of this application, the signal quality information of the intra-frequency (namely, the first frequency) includes a signal quality parameter of a first neighboring cell, and the signal quality information of the inter-frequency (namely, the second frequency) includes a signal quality parameter of a second neighboring cell. The first neighboring cell is a neighboring cell of the serving cell that uses a same frequency as the serving cell accessed by the terminal device; and the second neighboring cell is a neighboring cell of the serving cell that uses a frequency different from that of the serving cell. Optionally, the second neighboring cell and the serving cell may belong to a same mobile communications system or different mobile communications systems.

(6) The term "and/or" describes an association relationship between associated objects and indicates that three relationships may exist. For example, A and/or B may represent the following three cases: Only A exists, both A and B exist, and only B exists. The character "/" usually represents an "or" relationship between the associated objects.

It should be noted that "a plurality of" in this application means two or more.

In addition, it should be understood that in the descriptions of this application, terms such as "first" and "second" are merely used for distinguishing and description, but should not be understood as indicating or implying relative importance, or should not be understood as indicating or implying a sequence.

The following describes the embodiments of this application with reference to the accompanying drawings.

Figure 2:
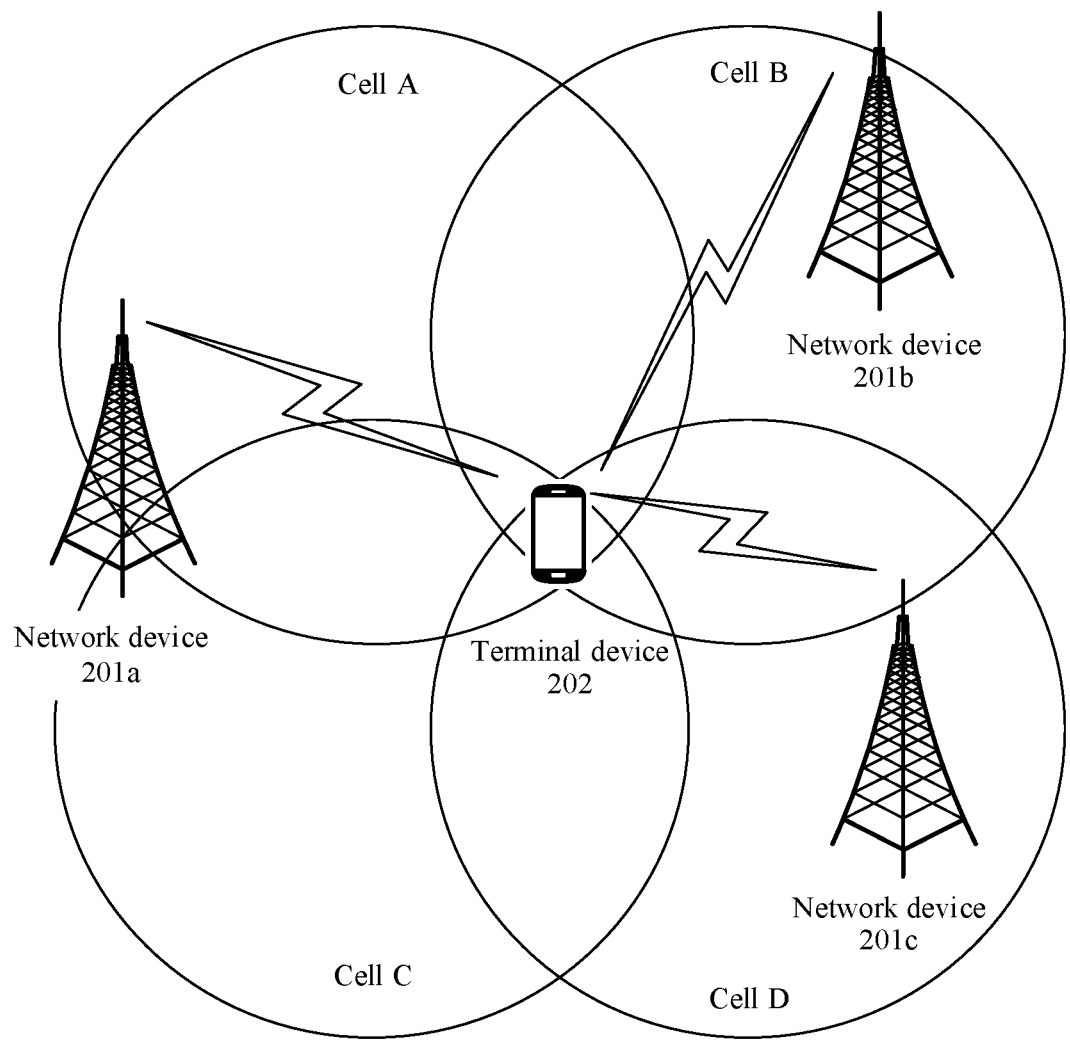
FIG. 2 is an architectural diagram of a communications system according to an embodiment of this application.

FIG. 2 shows an architecture of a possible communications system to which a method for determining signal quality information of a frequency according to an embodiment of this application is applicable. Refer to FIG. 2. The communications system includes network devices 201 (for example, a network device 201a, a network device 201b, and a network device 201c in the figure) and a terminal device 202.

The network device 201 is responsible for providing a radio access related service for the terminal device 202, and implementing a wireless physical layer function, resource scheduling and radio resource management, quality of service (Quality of Service, QoS) management, radio access control, and a mobility management function (for example, cell reselection and handover).

Each network device 201 is responsible for managing at least one cell. As shown in the figure, the network device 201a is responsible for managing a cell A and a cell C, the network device 201b is responsible for managing a cell B, and the network device 201c is responsible for managing a cell D.

In the communications system, each cell provides an access service for the terminal device by using a corresponding frequency. It should be noted that frequencies used by different cells may be the same or different. For example, the cell A uses a frequency 1, the cell B uses a frequency 2, the cell C uses a frequency 3, and the cell D uses a frequency 4. In addition, in the communications system, types of mobile communications systems to which the different cells belong may be the same or different. For example, a mobile communications system to which the cell A and the cell C belong is a fifth-generation ($5^{th}$ Generation, 5G) mobile communications system, and a mobile communications system to which the cell B and the cell D belong is a fourth-generation (The $4^{th}$ Generation, 4G) mobile communications system. In addition, different cells that belong to a same mobile communications system may use mobile communications technologies of different standards. For example, the cell A may use a frequency division duplex (frequency division duplex, FDD) communications technology, and the cell C may use a time division duplex (time division duplex, TDD) communications technology. In addition, to increase a data transmission rate of the terminal device 202 and a system capacity of the communications system, the communications system may use a carrier aggregation (carrier aggregation, CA) technology.

The terminal device 202 is a device that accesses a network through the cell managed by the network device 201.

The network device 201 is connected to the terminal device 202 by using a Uu interface, to implement communication between the terminal device 202 and the network device 201.

The method provided in this embodiment of this application is applicable to a multi-frequency scenario, that is, a cell in the communications system uses at least two frequencies. To ensure communication quality and service transmission efficiency of the terminal device 202 that accesses a serving cell, the network device 201 that manages the serving cell needs to select a carrier for the terminal device 202 based on signal quality information of each frequency, to implement cell reselection or handover.

It should be further noted that the communications system shown in FIG. 2 is used as an example and does not constitute a limitation on a communications system to which the method provided in this embodiment of this application is applicable. The method provided in this embodiment of this application is applicable to various communications systems that can generate a multi-frequency scenario.

The following uses an example in which the cell A and the cell C use the frequency 1, the cell B and the cell D use the frequency 2, and the terminal device 202 accesses the cell A (that is, the cell A is the serving cell of the terminal device 202) for description.

During cell reselection or handover performed by the network device 201a for the terminal device 202, the network device 201a needs to obtain signal quality information of the frequency 1 and signal quality information of the frequency 2, to select, for the terminal device 202, a target frequency whose signal quality information is optimal or meets a specified condition. Finally, a neighboring cell that uses the target frequency is used as a target cell for cell handover of the terminal device 202, or the serving cell that uses the target frequency continues to serve the terminal device 202.

In a conventional method, the network device 201a needs to perform neighboring cell measurement through the terminal device 202, to obtain the signal quality information of the frequency 1 and the signal quality information of the frequency 2. A specific process includes the following steps.

The network device 201a sends measurement configuration information to the terminal device 202, where the measurement configuration information includes content such as a to-be-measured frequency, a list of to-be-measured cells, a to-be-measured signal quality parameter, and a reporting manner.

Optionally, the measurement configuration information may be carried in an RRC connection reconfiguration (RRC connection reconfiguration) message. The to-be-measured frequency may be the frequency 1, the frequency 2, or the frequency 1 and the frequency 2. When the to-be-measured frequency includes the frequency 2, the measurement configuration information may further include measurement gap configuration information.

After receiving the measurement configuration information, the terminal device 202 may perform the neighboring cell measurement based on the content included in the measurement configuration information. For example, when the measurement configuration information includes the frequency 1 (an intra-frequency), the terminal device 202 needs to perform intra-frequency measurement based on the content in the measurement configuration information; or when the measurement configuration information includes the frequency 2 (an inter-frequency), the terminal device 202 needs to perform inter-frequency measurement or inter-RAT measurement based on the content in the measurement configuration information.

After completing all measurement, the terminal device 202 obtains the signal quality information of the frequency 1 and/or the signal quality information of the frequency 2, and then sends a measurement report to the network device 201a, where the measurement report includes the obtained signal quality information of the frequency 1 and/or the obtained signal quality information of the frequency 2.

The network device 201a selects the target frequency for the terminal device 202 based on the obtained signal quality information of the frequency 1 and/or the obtained signal quality information of the frequency 2, and then selects a target carrier from carriers corresponding to the target frequency, to complete cell reselection or handover.

It should be noted that, when the terminal device 202 is a CA user, the network device selects a plurality of target carriers for the terminal device. The plurality of target carriers may correspond to a same target frequency, or may correspond to different target frequencies. This is not limited in this application.

It is well-known that the terminal device 202 does not need to switch an operating frequency when performing the intra-frequency measurement. In this case, the terminal device 202 can perform the intra-frequency measurement while performing service transmission. Therefore, the service transmission does not need to be suspended when the terminal device 202 performs the intra-frequency measurement, so that the service transmission performed by the terminal device 202 is not affected, and there is no time delay during the intra-frequency measurement. However, when the terminal device 202 performs the inter-frequency measurement or the inter-RAT measurement, the service transmission needs to be suspended in a measurement gap. In addition, a time length (usually hundreds of ms) consumed for measuring each frequency is far greater than a time length of the measurement gap (usually 6 ms). Therefore, the terminal device 202 requires a plurality of measurement gaps to complete the inter-frequency measurement or the inter-RAT measurement. Consequently, the service transmission performed by the terminal device 202 needs to be interrupted for a plurality of times. In addition, because a measurement time length is relatively long, a time length for the network device 201 to select the carrier for the terminal device is further prolonged, and a carrier selection gain is affected.

Figure 3:
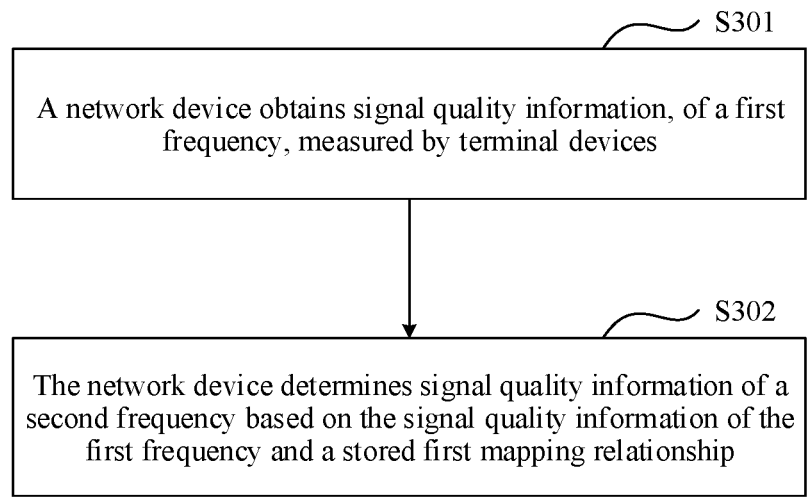
FIG. 3 is a flowchart of a method for determining feature information of a frequency according to an embodiment of this application.

To ensure service throughputs of the terminal devices and shorten a time length in which the network device determines the signal quality information of the inter-frequency, an embodiment of this application provides a method for determining signal quality information of a frequency. The method may be applied to a communications system having a multi-frequency scenario, for example, the communications system shown in FIG. 2. Refer to FIG. 3. A procedure of the method includes the following steps.

S301: A network device obtains signal quality information, of a first frequency, measured by terminal devices, where the first frequency is a frequency used by a serving cell accessed by the terminal devices.

The signal quality information of the first frequency is obtained by the terminal devices through intra-frequency measurement. The signal quality information of the first frequency includes a signal quality parameter of a first neighboring cell. The first neighboring cell is a neighboring cell that is of the serving cell and that uses the first frequency, and is also referred to as an intra-frequency neighboring cell. There may be at least one first neighboring cell.

Optionally, the network device may obtain, in a manner including but not limited to the following manners, the signal quality information, of the first frequency, measured by the terminal devices.

Manner 1: The network device may send measurement configuration information to the terminal devices, to indicate the terminal devices to perform the intra-frequency measurement. The measurement configuration information may include the following information: a to-be-measured frequency (namely, the first frequency), a list of to-be-measured cells (a list of first neighboring cells), a to-be-measured signal quality parameter, a reporting manner, and the like.

Manner 2: The terminal devices may perform the intra-frequency measurement, and report the measured signal quality information of the first frequency to the network device.

S302: The network device determines signal quality information of a second frequency based on the signal quality information of the first frequency and a stored first mapping relationship, where the second frequency is different from the first frequency, and the first mapping relationship is a mapping relationship between the signal quality information of the first frequency and the signal quality information of the second frequency.

Optionally, when there are a plurality of second frequencies in the communications system, there are also a plurality of corresponding first mapping relationships. That is, each second frequency corresponds to one first mapping relationship. A first mapping relationship corresponding to any second frequency is used to determine the signal quality information of the second frequency.

Optionally, the first mapping relationship corresponding to the second frequency is obtained by modeling sample data of the signal quality information of the first frequency and sample data of the signal quality information of the second frequency.

The sample data of the signal quality information of the first frequency includes signal quality information, of the first frequency, measured for a plurality of times by the plurality of terminal devices that access the serving cell. Signal quality information, of the first frequency, measured by each terminal device includes the signal quality parameter of the first neighboring cell.

The sample data of the signal quality information of the second frequency includes signal quality information, of the second frequency, measured for a plurality of times by the plurality of terminal devices that access the serving cell. Signal quality information, of the second frequency, measured by each terminal device includes a signal quality parameter of a second neighboring cell. The second neighboring cell is a neighboring cell that is of the serving cell and that uses the second frequency, and may also be referred to as an inter-frequency neighboring cell. There is at least one second neighboring cell.

According to the foregoing steps, the network device may quickly obtain signal quality information of an inter-frequency (namely, the second frequency) based on signal quality information, of an intra-frequency (namely, the first frequency), obtained from the terminal devices, where the signal quality information of the intra-frequency is obtained by the terminal devices through the intra-frequency measurement.

After S302, the network device may select a target frequency having high signal quality for the terminal devices based on the obtained signal quality information of the first frequency and the determined signal quality information of the second frequency; then use a carrier corresponding to the target frequency as a target carrier of the terminal devices; and use, as a target cell for cell reselection or handover of the terminal devices, a cell that uses the target carrier. In this way, signal transmission quality of the terminal devices obtained after the terminal devices are handed over to the target cell can be ensured.

Optionally, in this embodiment of this application, spectral efficiency of the serving cell may be further determined by performing the following steps.

The network device obtains load information of the first neighboring cell.

The network device determines the spectral efficiency of the serving cell based on the signal quality information of the first frequency, the load information of the first neighboring cell, and a stored second mapping relationship, where the second mapping relationship is a mapping relationship between the signal quality information of the first frequency and the load information of the first neighboring cell and the spectral efficiency of the serving cell.

The load information of the first neighboring cell is obtained by the network device from a network device that manages the first neighboring cell.

Similar to the first mapping relationship, the second mapping relationship is also in a one-to-one correspondence with the second frequency. That is, when there are a plurality of second frequencies in the communications system, each second frequency corresponds to one second mapping relationship.

Optionally, the second mapping relationship corresponding to the second frequency is obtained by modeling the sample data of the signal quality information of the first frequency, sample data of the load information of the first neighboring cell, and sample data of the spectral efficiency of the serving cell.

The sample data of the load information of the first neighboring cell includes load information, of the first neighboring cell, obtained each time the plurality of terminal devices that access the serving cell measure the signal quality information of the first frequency.

The sample data of the spectral efficiency of the serving cell includes spectral efficiency, of the serving cell, obtained each time the plurality of terminal devices that access the serving cell measure the signal quality information of the first frequency.

According to the foregoing steps, the network device may further quickly obtain the spectral efficiency of the serving cell based on the obtained load information of the first neighboring cell.

In this way, when the network device selects the target frequency and the target carrier (namely, the target cell) for the terminal devices, a factor of the spectral efficiency of the serving cell may be further considered. Therefore, after the terminal devices are handed over to the target cell, not only the signal transmission quality of the terminal devices but also signal transmission efficiency of the terminal devices can be ensured.

Optionally, in this embodiment of this application, spectral efficiency of the second neighboring cell may be further determined by performing the following steps.

The network device obtains load information of the second neighboring cell.

The network device determines the spectral efficiency of the second neighboring cell based on the signal quality information of the first frequency, the load information of the second neighboring cell, and a stored third mapping relationship, where the third mapping relationship is a mapping relationship between the signal quality information of the first frequency and the load information of the second neighboring cell and the spectral efficiency of the second neighboring cell.

The load information of the second neighboring cell is obtained by the network device from a network device that manages the second neighboring cell.

Similar to the first mapping relationship and the second mapping relationship, the third mapping relationship is also in a one-to-one correspondence with the second frequency. That is, when there are a plurality of second frequencies in the communications system, each second frequency corresponds to one third mapping relationship.

Optionally, the third mapping relationship corresponding to the second frequency is obtained by modeling the sample data of the signal quality information of the first frequency, sample data of the load information of the second neighboring cell, and sample data of the spectral efficiency of the second neighboring cell.

The sample data of the load information of the second neighboring cell includes load information, of the second neighboring cell, obtained each time the plurality of terminal devices that access the serving cell measure the signal quality information of the second frequency.

The sample data of the spectral efficiency of the second neighboring cell includes spectral efficiency, of the second neighboring cell, obtained each time the plurality of terminal devices that access the serving cell measure the signal quality information of the second frequency.

According to the foregoing steps, the network device may further quickly obtain the spectral efficiency of the second neighboring cell based on the obtained load information of the second neighboring cell.

In this way, when the network device selects the target frequency and the target carrier (namely, the target cell) for the terminal devices, a factor of the spectral efficiency of the second neighboring cell may be further considered. Therefore, after the terminal devices are handed over to the target cell, not only the signal transmission quality of the terminal devices but also signal transmission efficiency of the terminal devices can be ensured.

It should be noted that, in this embodiment of this application, when the terminal devices are CA users, the network device may select a target carrier combination for the terminal devices based on the obtained and determined factors.

According to the foregoing method provided in this embodiment of this application, the terminal devices do not need to perform the inter-frequency measurement or the inter-RAT measurement, but only need to perform the intra-frequency measurement and report the signal quality information of the intra-frequency to the network device, so that the network device can determine the signal quality information of the inter-frequency. In this way, the network device may select the carrier for the terminal devices (that is, select the target cell for the terminal devices during cell reselection or handover) based on the signal quality information of the intra-frequency and the signal quality information of the inter-frequency. Clearly, because the terminal devices do not need to perform the inter-frequency measurement or the inter-RAT measurement, in addition to ensuing a carrier selection gain, the method can further ensure service continuity and service throughputs of the terminal devices, and avoid the overheads of the inter-frequency measurement and the inter-RAT measurement. In addition, because time lengths in which the terminal devices perform the intra-frequency measurement are far less than time lengths in which the terminal devices perform the inter-frequency measurement and the inter-RAT measurement, the method may further shorten a time length in which the network device determines the signal quality information of the inter-frequency.

In addition, in this solution, the network device may quickly obtain the signal quality information of the first frequency, the signal quality information of the second frequency, the spectral efficiency of the serving cell, and the spectral efficiency of the second neighboring cell, and select the target cell for the terminal devices by comprehensively considering the foregoing factors. In this way, after the terminal devices are handed over to the target cell, not only the signal transmission quality of the terminal devices but also the signal transmission efficiency of the terminal devices can be ensured.

It should be noted that, in the foregoing embodiment, the first mapping relationship, the second mapping relationship, and the third mapping relationship may all be obtained by a computing device by modeling corresponding sample data by using a machine learning technology. The computing device may be a network device, or may be another device such as a server or a core network device. When the computing device is not the network device, after obtaining the mapping relationships through modeling, the computing device may further send the mapping relationships to the network device.

Using an example in which the computing device is the network device, the following describes in detail a procedure of maintaining each mapping relationship by the network device.

The network device maintains, by performing the following steps, a first mapping relationship corresponding to any second frequency.

A1: The network device collects a plurality of pieces of first sample data.

In this step, the network device indicates, for a plurality of times, the plurality of terminal devices that access the serving cell managed by the network device to perform the intra-frequency measurement, and the inter-frequency measurement or the inter-RAT measurement; and then receives the signal quality information, of the first frequency, obtained by the plurality of terminal devices through the intra-frequency measurement, and receives the signal quality information, of the second frequency, obtained by the plurality of terminal devices through the inter-frequency measurement or the inter-RAT measurement.

One piece of first sample data includes signal quality information, of the first frequency, obtained through intra-frequency measurement, and signal quality information, of the second frequency, obtained through inter-frequency measurement or inter-RAT measurement, where the network device indicates, at a same time, the terminal devices to perform the intra-frequency measurement and to perform the inter-frequency measurement or the inter-RAT measurement.

For example, in a phase of a plurality times of first sample data collection, terminal devices indicated by the network device each time to perform neighboring cell measurement may be the same, or may be different. This is not limited in this embodiment of this application.

In a possible implementation, during any time of first sample data collection, terminal devices indicated by the network device to perform the intra-frequency measurement may be the same as or different from the terminal devices indicated by the network device to perform the inter-frequency measurement or the inter-RAT measurement. This is not limited in this embodiment of this application.

In another possible implementation, the network device may alternatively implement any time of first sample data collection by using a conventional method. For example, the network device sends the measurement configuration information to the terminal devices, to indicate a terminal device to perform the neighboring cell measurement, where the measurement configuration information includes content such as the to-be-measured frequency (the first frequency or the second frequency), the list of to-be-measured neighboring cells, the to-be-measured signal quality parameter, and the reporting manner. The terminal device performs the neighboring cell measurement (the intra-frequency measurement, the inter-frequency measurement, or the inter-RAT measurement) based on the measurement configuration information, and sends a generated measurement report to the network device in the configured report manner.

A2: The network device models the plurality of pieces of collected first sample data by using the machine learning technology, to obtain the first mapping relationship.

Optionally, the network device may perform modeling by using the machine learning technology such as a neural network, a support vector machine, or a genetic algorithm. This is not limited in this embodiment of this application.

A3: The network device monitors accuracy of the first mapping relationship. When the accuracy of the first mapping relationship is relatively low, the network device stops using the first mapping relationship, and may update the first mapping relationship by repeating steps A1 and A2, or repeating step A2.

Optionally, the network device may monitor the accuracy of the first mapping relationship in a manner including but not limited to the following manners.

Manner 1: The network device monitors a cell configuration success rate. When the configuration success rate is less than a specified success rate threshold, the network device determines that the accuracy of the first mapping relationship is relatively low.

Each time after the network device determines the signal quality information of the second frequency based on the first mapping relationship, and selects the target cell for the terminal devices based on the signal quality information of the second frequency, the network device updates the cell configuration success rate.

Cell configuration success rate=Quantity of terminal devices that successfully access the target cell determined by the network device for the terminal devices/Total quantity of terminal devices for which the network device determines the target cell.

Manner 2: The network device periodically tests the first mapping relationship.

In this manner, the network device may indicate the terminal devices that access the serving cell to perform the intra-frequency measurement, and the inter-frequency measurement or the inter-RAT measurement, to obtain the signal quality information of the first frequency and the signal quality information of the second frequency. Then, the network device uses the obtained signal quality information of the first frequency and the obtained signal quality information of the second frequency as test data; and calculates signal quality information of the second frequency based on the signal quality information of the first frequency in the test data and the first mapping relationship. Finally, the network device determines a difference between the calculated signal quality information of the second frequency and the signal quality information of the second frequency in the test data. When the difference is less than a specified difference threshold, it indicates that the accuracy of the first mapping relationship is relatively high; or when the difference is greater than or equal to the specified difference threshold, it indicates that the accuracy of the first mapping relationship is relatively low.

By performing step A3, the network device can ensure the accuracy of the first mapping relationship. In this way, when the network device calculates the signal quality information of the second frequency based on the first mapping relationship, an error between the calculated signal quality information of the second frequency and actual signal quality information of the second frequency can be reduced.

A step in which the network device maintains a second mapping relationship corresponding to any second frequency includes the following steps.

B1: The network device collects a plurality of pieces of second sample data.

In this step, the network device indicates, for a plurality of times, the plurality of terminal devices that access the serving cell managed by the network device to perform the intra-frequency measurement; and then receives the signal quality information, of the first frequency, obtained by the plurality of terminal devices through the intra-frequency measurement. Each time the network device indicates the terminal devices to perform the intra-frequency measurement, the network device obtains the load information of the first neighboring cell from the network device that manages the first neighboring cell, and receives the spectral efficiency of the serving cell reported by the terminal devices that access the serving cell. The first neighboring cell is a neighboring cell that is of the serving cell and that uses the first frequency, and is also referred to as an intra-frequency neighboring cell.

One piece of second sample data includes signal quality information, of the first frequency, obtained when the network device indicates, at a time, the terminal devices to perform the intra-frequency measurement, load information, of the first neighboring cell, obtained when the plurality of terminal devices that access the serving cell perform the intra-frequency measurement this time, and spectral efficiency, of the serving cell, obtained when the plurality of terminal devices that access the serving cell perform the intra-frequency measurement this time.

B2 and B3 are the same as steps A2 and A3. Details are not described herein again.

Optionally, the network device may perform step B1 when performing step A1. In this way, the signal quality information, of the first frequency, obtained by the terminal devices each time through the intra-frequency measurement may be used as a piece of sample data in first sample data, or may be used as a piece of sample data in second sample data.

A step in which the network device maintains a third mapping relationship corresponding to any second frequency includes the following steps.

C1: The network device collects a plurality of pieces of third sample data.

In this step, similar to step A1, the network device obtains the signal quality information of the first frequency. Each time the network device indicates the terminal devices to perform the inter-frequency measurement or the inter-RAT measurement, the network device obtains the load information of the second neighboring cell from the network device that manages the second neighboring cell, and receives the spectral efficiency of the serving cell reported by the terminal devices that access the second neighboring cell. The spectral efficiency of the second neighboring cell is obtained when the terminal devices obtain the signal quality information of the second frequency through the inter-frequency measurement or the inter-RAT measurement. The second neighboring cell is a neighboring cell that is of the serving cell and that uses the second frequency, and may also be referred to as an inter-frequency neighboring cell.

One piece of third sample data includes signal quality information, of the first frequency, obtained when the network device indicates, at a time, the terminal devices to perform the intra-frequency measurement, load information, of the second neighboring cell, obtained when the plurality of terminal devices that access the serving cell perform the inter-frequency measurement or the inter-RAT measurement this time, and spectral efficiency, of the second neighboring cell, obtained when the plurality of terminal devices that access the serving cell perform the inter-frequency measurement or the inter-RAT measurement this time.

Similarly, C2 and C3 are the same as steps A2 and A3. Details are not described herein again.

Optionally, the network device may perform step C1 when performing step A1. In this way, the signal quality information, of the first frequency, obtained by the terminal devices each time through the intra-frequency measurement may be used as a piece of sample data in first sample data, or may be used as a piece of sample data in third sample data.

It should be further noted that, when the computing device is not the network device, the computing device collects sample data through the network device, and monitors each mapping relationship through the network device. When the network device learns, through monitoring, that the accuracy of the mapping relationship is relatively low, the network device indicates the computing device to remodel and update the mapping relationship.

Figure 4:
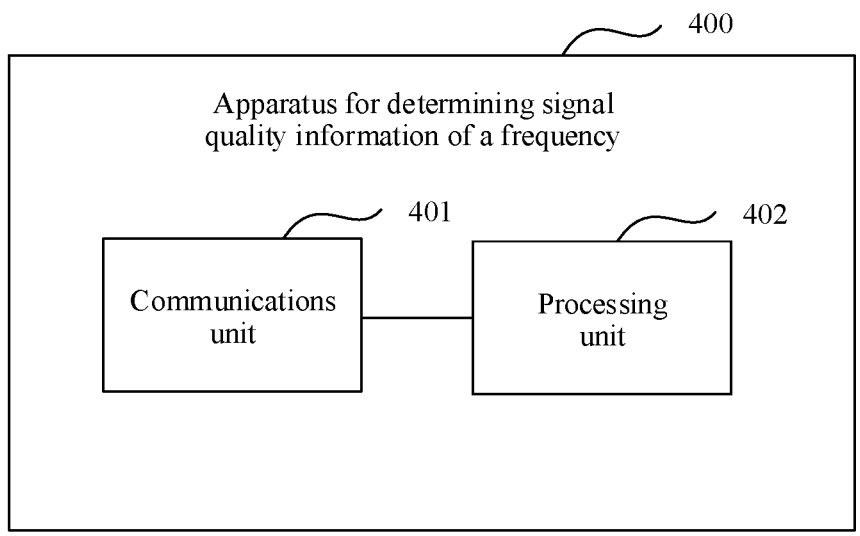
FIG. 4 is a diagram of a structure of an apparatus for determining feature information of a frequency according to an embodiment of this application.

Based on the foregoing embodiments, an embodiment of this application further provides an apparatus for determining signal quality information of a frequency. The apparatus is used in a network device. The network device may be used in the communications system shown in FIG. 2, and may implement the method for determining signal quality information of a frequency shown in FIG. 3. Refer to FIG. 4. The apparatus 400 includes a communications unit 401 and a processing unit 402. The following describes functions of each unit in the apparatus 400.

The communications unit 401 is configured to obtain signal quality information, of a first frequency, measured by terminal devices, where the first frequency is a frequency used by a serving cell accessed by the terminal devices.

The processing unit 402 is configured to determine signal quality information of a second frequency based on the signal quality information of the first frequency and a stored first mapping relationship, where the second frequency is different from the first frequency, and the first mapping relationship is a mapping relationship between the signal quality information of the first frequency and the signal quality information of the second frequency.

In an implementation, the first mapping relationship is obtained by modeling sample data of the signal quality information of the first frequency and sample data of the signal quality information of the second frequency.

The sample data of the signal quality information of the first frequency includes signal quality information, of the first frequency, measured for a plurality of times by the plurality of terminal devices that access the serving cell; and signal quality information, of the first frequency, measured by each terminal device includes a signal quality parameter of a first neighboring cell, where the first neighboring cell uses the first frequency.

The sample data of the signal quality information of the second frequency includes signal quality information, of the second frequency, measured for a plurality of times by the plurality of terminal devices that access the serving cell; and signal quality information, of the second frequency, measured by each terminal device includes a signal quality parameter of a second neighboring cell, where the second neighboring cell uses the second frequency.

In an implementation, the communications unit 401 is further configured to obtain load information of the first neighboring cell.

The processing unit 402 is further configured to determine spectral efficiency of the serving cell based on the signal quality information of the first frequency, the load information of the first neighboring cell, and a stored second mapping relationship, where the second mapping relationship is a mapping relationship between the signal quality information of the first frequency and the load information of the first neighboring cell and the spectral efficiency of the serving cell.

In an implementation, the second mapping relationship is obtained by modeling the sample data of the signal quality information of the first frequency, sample data of the load information of the first neighboring cell, and sample data of the spectral efficiency of the serving cell.

The sample data of the load information of the first neighboring cell includes load information, of the first neighboring cell, obtained each time the plurality of terminal devices that access the serving cell measure the signal quality information of the first frequency.

The sample data of the spectral efficiency of the serving cell includes spectral efficiency, of the serving cell, obtained each time the plurality of terminal devices that access the serving cell measure the signal quality information of the first frequency.

In an implementation, the communications unit 401 is further configured to obtain load information of the second neighboring cell.

The processing unit 402 is further configured to determine spectral efficiency of the second neighboring cell based on the signal quality information of the first frequency, the load information of the second neighboring cell, and a stored third mapping relationship, where the third mapping relationship is a mapping relationship between the signal quality information of the first frequency and the load information of the second neighboring cell and the spectral efficiency of the second neighboring cell.

In an implementation, the third mapping relationship is obtained by modeling the sample data of the signal quality information of the first frequency, sample data of the load information of the second neighboring cell, and sample data of the spectral efficiency of the second neighboring cell.

The sample data of the load information of the second neighboring cell includes load information, of the second neighboring cell, obtained each time the plurality of terminal devices that access the serving cell measure the signal quality information of the second frequency.

The sample data of the spectral efficiency of the second neighboring cell includes spectral efficiency, of the second neighboring cell, obtained each time the plurality of terminal devices that access the serving cell measure the signal quality information of the second frequency.

This embodiment of this application provides the apparatus for determining signal quality information of a frequency. The apparatus may be used in the network device. According to this solution, the terminal devices do not need to perform inter-frequency measurement or inter-RAT measurement, but only need to perform intra-frequency measurement and report signal quality information of an intra-frequency to the network device, so that the network device can determine signal quality information of an inter-frequency. In this way, the network device may select a carrier for the terminal devices (that is, select a target cell for the terminal devices during cell reselection or handover) based on the signal quality information of the intra-frequency and the signal quality information of the inter-frequency. Clearly, because the terminal devices do not need to perform the inter-frequency measurement or the inter-RAT measurement, in addition to ensuing a carrier selection gain, the method can further ensure service continuity and service throughputs of the terminal devices, and avoid overheads of the inter-frequency measurement and the inter-RAT measurement. In addition, because time lengths in which the terminal devices perform the intra-frequency measurement are far less than time lengths in which the terminal devices perform the inter-frequency measurement and the inter-RAT measurement, the method may further shorten a time length in which the network device determines the signal quality information of the inter-frequency.

It should be noted that, in the foregoing embodiments of this application, division into the modules is an example and is merely logical function division, and may be other division during actual implementation. In addition, functional units in the embodiments of this application may be integrated into one processing unit, or may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, or a network device) or a processor (processor) to perform all or some of the steps of the method described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Figure 5:
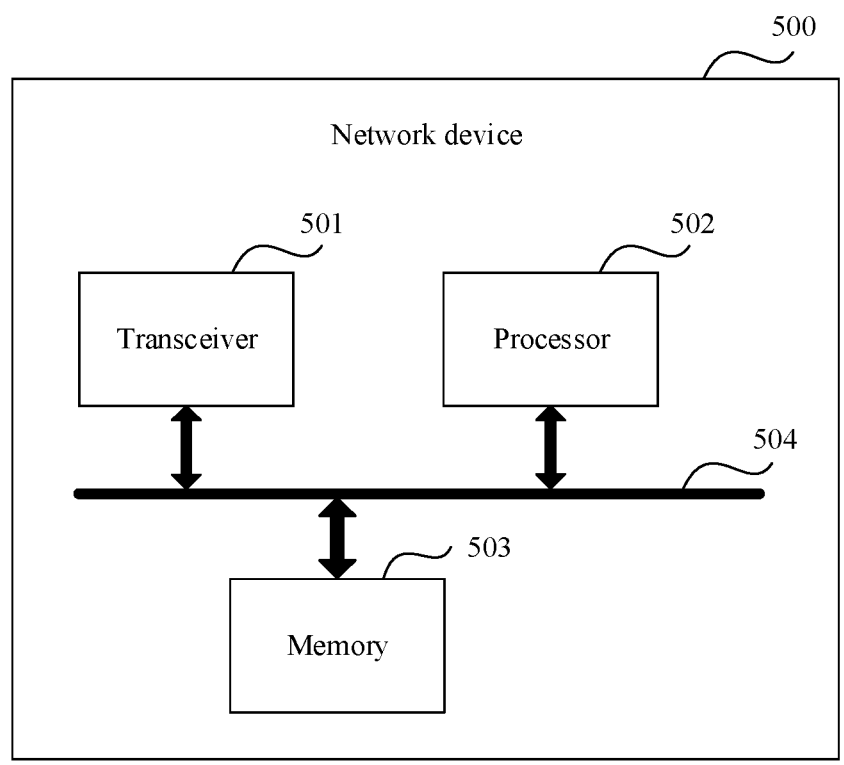
FIG. 5 is a diagram of a structure of a network device according to an embodiment of this application.

Based on the foregoing embodiments, an embodiment of this application further provides a network device. The network device is configured to implement the method for determining signal quality information of a frequency shown in FIG. 3. Refer to FIG. 5. The network device includes a transceiver 501, a processor 502, and a memory 503. The transceiver 501, the processor 502, and the memory 503 are connected to each other.

Optionally, the transceiver 501, the processor 502, and the memory 503 are connected to each other by using a bus 504. The bus 504 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 5, but this does not mean that there is only one bus or only one type of bus.

The transceiver 501 is configured to receive and send data, to communicate with another device (for example, a terminal device).

The processor 502 is configured to perform the method for determining signal quality information of a frequency in FIG. 3. For details, refer to the descriptions in the foregoing embodiments. Details are not described herein again.

The memory 503 is configured to store program instructions, data, and the like. Specifically, the program instructions may include program code, the program code includes computer operation instructions, and the data includes the first mapping relationship, the second mapping relationship, the third mapping relationship, and the like. The memory 503 may include a random access memory (random access memory, RAM), or may include anon-volatile memory (non-volatile memory), for example, at least one magnetic disk memory. The processor 502 executes the program instructions stored in the memory 503, and implements the foregoing functions by using the data stored in the memory 503, thereby implementing the method for determining signal quality information of a frequency provided in the foregoing embodiments.

Based on the foregoing embodiments, an embodiment of this application further provides a computer program. When the computer program is run on a computer, the computer is enabled to perform the method for determining signal quality information of a frequency provided in the embodiment shown in FIG. 3.

Based on the foregoing embodiments, an embodiment of this application further provides a computer storage medium. The computer storage medium stores a computer program, and when the computer program is executed by a computer, the computer is enabled to perform the method for determining signal quality information of a frequency provided in the embodiment shown in FIG. 3.

Based on the foregoing embodiments, an embodiment of this application further provides a chip. The chip is configured to read a computer program stored in a memory, to implement the method for determining signal quality information of a frequency provided in the embodiment shown in FIG. 3.

Based on the foregoing embodiments, an embodiment of this application further provides a chip system. The chip system includes a processor, configured to support a computer apparatus in implementing the functions related to the network device in the embodiment shown in FIG. 3. In a possible design, the chip system further includes a memory. The memory is configured to store a program and data that are necessary for the computer apparatus. The chip system may include a chip, or may include a chip and another discrete component.

In conclusion, this application provides the method and the apparatus for determining signal quality information of a frequency. In the solutions, the network device may quickly obtain the signal quality information of the inter-frequency (namely, the second frequency) based on the signal quality information, of the intra-frequency (namely, the first frequency), obtained by the terminal devices through the intra-frequency measurement and the mapping relationship between the signal quality information of the intra-frequency and the signal quality information of the inter-frequency. In this method, the terminal devices do not need to perform the inter-frequency measurement or the inter-RAT measurement, but only need to perform the intra-frequency measurement and report the signal quality information of the intra-frequency to the network device, so that the network device can determine the signal quality information of the inter-frequency. In this way, the network device may select the carrier for the terminal devices (that is, select the target cell for the terminal devices during cell reselection or handover) based on the signal quality information of the intra-frequency and the signal quality information of the inter-frequency. Clearly, because the terminal devices do not need to perform the inter-frequency measurement or the inter-RAT measurement, in addition to ensuing the carrier selection gain, the method can further ensure the service continuity and the service throughputs of the terminal devices, and avoid the overheads of the inter-frequency measurement and the inter-RAT measurement. In addition, because the time lengths in which the terminal devices perform the intra-frequency measurement are far less than the time lengths in which the terminal devices perform the inter-frequency measurement and the inter-RAT measurement, the method may further shorten the time length in which the network device determines the signal quality information of the inter-frequency.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

The computer program instructions may alternatively be loaded onto a computer or another programmable data processing device, so that a series of operations and steps are performed on the computer or another programmable device, thereby generating computer-implemented processing. Therefore, the instructions executed on the computer or the another programmable device provide steps for implementing a specified function in one or more processes in the flowcharts and/or in one or more blocks in the block diagrams.

Clearly, a person skilled in the art can make various modifications and variations to the embodiments of this application without departing from the scope of this application. This application is intended to cover these modifications and variations of the embodiments of this application provided that they fall within the scope of protection defined by the following claims and their equivalent technologies.

What is claimed is:

1. A method for determining signal quality information of a frequency, comprising:
   obtaining, by a network device, signal quality information, of a first frequency, from a plurality of terminal devices, wherein the first frequency is a frequency used by a serving cell accessed by the plurality of terminal devices;
   determining, by the network device, signal quality information of a second frequency based on the signal quality information of the first frequency and a stored first mapping relationship, wherein the second frequency is different from the first frequency, and the first mapping relationship is a mapping relationship between the signal quality information of the first frequency and the signal quality information of the second frequency, wherein the first mapping relationship is obtained by modeling sample data of the signal quality information of the first frequency and sample data of the signal quality information of the second frequency, wherein
      the signal quality information of the first frequency comprises a signal quality parameter of a first neighboring cell that uses the first frequency, and the sample data of the signal quality information of the first frequency comprises the signal quality information of the first frequency measured for a plurality of times by the plurality of terminal devices that access the serving cell, and
      the signal quality information of the second frequency comprises a signal quality parameter of a second neighboring cell that uses the second frequency, and the sample data of the signal quality information of the second frequency comprises the signal quality information of the second frequency measured for a plurality of times by the plurality of terminal devices that access the serving cell; and
   performing at least one of the following:
      determining, by the network device, spectral efficiency of the serving cell based on the signal quality information of the first frequency, load information of the first neighboring cell, and a stored second mapping relationship, wherein the second mapping relationship is a mapping relationship between the signal quality information of the first frequency and the load information of the first neighboring cell and the spectral efficiency of the serving cell; or
      determining, by the network device, spectral efficiency of the second neighboring cell based on the signal quality information of the first frequency, load information of the second neighboring cell, and a stored third mapping relationship, wherein the third mapping relationship is a mapping relationship between the signal quality information of the first frequency and the load information of the second neighboring cell and the spectral efficiency of the second neighboring cell.

2. The method according to claim 1, wherein the method further comprises:
   obtaining, by the network device, the load information of the first neighboring cell.

3. The method according to claim 1, wherein the second mapping relationship is obtained by modeling the sample data of the signal quality information of the first frequency, sample data of the load information of the first neighboring cell, and sample data of the spectral efficiency of the serving cell, wherein
   the sample data of the load information of the first neighboring cell comprises load information, of the first neighboring cell, obtained each time the plurality of terminal devices that access the serving cell measure the signal quality information of the first frequency; and
   the sample data of the spectral efficiency of the serving cell comprises spectral efficiency, of the serving cell, obtained each time the plurality of terminal devices that access the serving cell measure the signal quality information of the first frequency.

4. The method according to claim 1, wherein the method further comprises:
   obtaining, by the network device, the load information of the second neighboring cell.

5. The method according to claim 1, wherein the third mapping relationship is obtained by modeling the sample data of the signal quality information of the first frequency, sample data of the load information of the second neighboring cell, and sample data of the spectral efficiency of the second neighboring cell, wherein
   the sample data of the load information of the second neighboring cell comprises load information, of the second neighboring cell, obtained each time the plurality of terminal devices that access the serving cell measure the signal quality information of the second frequency; and
   the sample data of the spectral efficiency of the second neighboring cell comprises spectral efficiency, of the second neighboring cell, obtained each time the plurality of terminal devices that access the serving cell measure the signal quality information of the second frequency.

6. An apparatus for determining signal quality information of a frequency, wherein the apparatus comprises:
   at least one processor; and
   one or more memories coupled to the at least one processor and storing programming instructions for execution by the at least one processor to cause the apparatus to:
   obtain signal quality information, of a first frequency, from a plurality of terminal devices, wherein the first frequency is a frequency used by a serving cell accessed by the plurality of terminal devices;
   determine signal quality information of a second frequency based on the signal quality information of the first frequency and a stored first mapping relationship, wherein the second frequency is different from the first frequency, and the first mapping relationship is a mapping relationship between the signal quality information of the first frequency and the signal quality information of the second frequency, wherein the first mapping relationship is obtained by modeling sample data of the signal quality information of the first frequency and sample data of the signal quality information of the second frequency, wherein the signal quality information of the first frequency comprises a signal quality parameter of a first neighboring cell that uses the first frequency, and the sample data of the signal quality information of the first frequency comprises the signal quality information of the first frequency measured for a plurality of times by the plurality of terminal devices that access the serving cell, and the signal quality information of the second frequency comprises a signal quality parameter of a second neighboring cell that uses the second frequency, and the sample data of the signal quality information of the second frequency comprises the signal quality information of the second frequency measured for a plurality of times by the plurality of terminal devices that access the serving cell; and perform at least one of the following:

determining spectral efficiency of the serving cell based on the signal quality information of the first frequency, load information of the first neighboring cell, and a stored second mapping relationship, wherein the second mapping relationship is a mapping relationship between the signal quality information of the first frequency and the load information of the first neighboring cell and the spectral efficiency of the serving cell; or determining spectral efficiency of the second neighboring cell based on the signal quality information of the first frequency, load information of the second neighboring cell, and a stored third mapping relationship, wherein the third mapping relationship is a mapping relationship between the signal quality information of the first frequency and the load information of the second neighboring cell and the spectral efficiency of the second neighboring cell.

7. The apparatus according to claim 6, wherein the programming instructions, when executed by the at least one processor, cause the apparatus to:

obtain the load information of the first neighboring cell.

8. The apparatus according to claim 6, wherein the second mapping relationship is obtained by modeling the sample data of the signal quality information of the first frequency, sample data of the load information of the first neighboring cell, and sample data of the spectral efficiency of the serving cell, wherein the sample data of the load information of the first neighboring cell comprises load information, of the first neighboring cell, obtained each time the plurality of terminal devices that access the serving cell measure the signal quality information of the first frequency; and the sample data of the spectral efficiency of the serving cell comprises spectral efficiency, of the serving cell, obtained each time the plurality of terminal devices that access the serving cell measure the signal quality information of the first frequency.

9. The apparatus according to claim 6, wherein the programming instructions, when executed by the at least one processor, cause the apparatus to:

obtain the load information of the second neighboring cell.

10. The apparatus according to claim 6, wherein the third mapping relationship is obtained by modeling the sample data of the signal quality information of the first frequency, sample data of the load information of the second neighboring cell, and sample data of the spectral efficiency of the second neighboring cell, wherein the sample data of the load information of the second neighboring cell comprises load information, of the second neighboring cell, obtained each time the plurality of terminal devices that access the serving cell measure the signal quality information of the second frequency; and the sample data of the spectral efficiency of the second neighboring cell comprises spectral efficiency, of the second neighboring cell, obtained each time the plurality of terminal devices that access the serving cell measure the signal quality information of the second frequency.

11. A non-transitory computer readable medium, wherein the non-transitory computer readable medium stores instructions that are executable by a computer, and the instructions comprise instructions for:

obtaining signal quality information, of a first frequency, from a plurality of terminal devices, wherein the first frequency is a frequency used by a serving cell accessed by the plurality of terminal devices;

determining signal quality information of a second frequency based on the signal quality information of the first frequency and a stored first mapping relationship, wherein the second frequency is different from the first frequency, and the first mapping relationship is a mapping relationship between the signal quality information of the first frequency and the signal quality information of the second frequency, wherein the first mapping relationship is obtained by modeling sample data of the signal quality information of the first frequency and sample data of the signal quality information of the second frequency, wherein the signal quality information of the first frequency comprises a signal quality parameter of a first neighboring cell that uses the first frequency, and the sample data of the signal quality information of the first frequency comprises the signal quality information of the first frequency measured for a plurality of times by the plurality of terminal devices that access the serving cell, and the signal quality information of the second frequency comprises a signal quality parameter of a second neighboring cell that uses the second frequency, and the sample data of the signal quality information of the second frequency comprises the signal quality information of the second frequency measured for a plurality of times by the plurality of terminal devices that access the serving cell; and performing at least one of the following:

determining spectral efficiency of the serving cell based on the signal quality information of the first frequency, load information of the first neighboring cell, and a stored second mapping relationship, wherein the second mapping relationship is a mapping relationship between the signal quality information of the first frequency and the load information of the first neighboring cell and the spectral efficiency of the serving cell; or determining spectral efficiency of the second neighboring cell based on the signal quality information of the first frequency, load information of the second neighboring cell, and a stored third mapping relationship, wherein the third mapping relationship is a mapping relationship between the signal quality information of the first frequency and the load information of the second neighboring cell and the spectral efficiency of the second neighboring cell.

12. The non-transitory computer readable medium according to claim 11, wherein the instructions further comprise instructions for:
obtaining the load information of the first neighboring cell.

13. The non-transitory computer readable medium according to claim 11, wherein the second mapping relationship is obtained by modeling the sample data of the signal quality information of the first frequency, sample data of the load information of the first neighboring cell, and sample data of the spectral efficiency of the serving cell, wherein
the sample data of the load information of the first neighboring cell comprises load information, of the first neighboring cell, obtained each time the plurality of terminal devices that access the serving cell measure the signal quality information of the first frequency; and
the sample data of the spectral efficiency of the serving cell comprises spectral efficiency, of the serving cell, obtained each time the plurality of terminal devices that access the serving cell measure the signal quality information of the first frequency.

14. The non-transitory computer readable medium according to claim 11, wherein the instructions further comprise instructions for:
obtaining the load information of the second neighboring cell.

15. The non-transitory computer readable medium according to claim 11, wherein the third mapping relationship is obtained by modeling the sample data of the signal quality information of the first frequency, sample data of the load information of the second neighboring cell, and sample data of the spectral efficiency of the second neighboring cell, wherein
the sample data of the load information of the second neighboring cell comprises load information, of the second neighboring cell, obtained each time the plurality of terminal devices that access the serving cell measure the signal quality information of the second frequency; and
the sample data of the spectral efficiency of the second neighboring cell comprises spectral efficiency, of the second neighboring cell, obtained each time the plurality of terminal devices that access the serving cell measure the signal quality information of the second frequency.

\* \* \* \* \*